US012795198B2

(12) United States Patent
Doe

(10) Patent No.: US 12,795,198 B2
(45) Date of Patent: *Nov. 10, 2026

(54) METHODS, APPARATUS AND ARTICLES OF MANUFACTURE TO ESTIMATE LOCAL MARKET AUDIENCES OF MEDIA CONTENT

(71) Applicant: The Nielsen Company (US), LLC, New York, NY (US)

(72) Inventor: Peter Campbell Doe, Ridgewood, NJ (US)

(73) Assignee: The Nielsen Company (US), LLC, New York, NY (US)

(*) Notice: Subject to any disclaimer, the term of this patent is extended or adjusted under 35 U.S.C. 154(b) by 33 days.

This patent is subject to a terminal disclaimer.

(21) Appl. No.: 19/092,080

(22) Filed: Mar. 27, 2025

(65) Prior Publication Data

US 2025/0227327 A1 Jul. 10, 2025

Related U.S. Application Data

(63) Continuation of application No. 18/508,917, filed on Nov. 14, 2023, now Pat. No. 12,267,554, which is a (Continued)

(51) Int. Cl.
*H04N 21/442* (2011.01)
*H04H 60/31* (2008.01)
(Continued)

(52) U.S. Cl.
CPC ...... *H04N 21/44213* (2013.01); *H04H 60/31* (2013.01); *H04H 60/66* (2013.01); (Continued)

(58) Field of Classification Search
None
See application file for complete search history.

(56) References Cited

U.S. PATENT DOCUMENTS

2005/0149946 A1 7/2005 Evans
2017/0091786 A1 3/2017 Sheppard et al.
(Continued)

OTHER PUBLICATIONS

United States Patent and Trademark Office, Non-Final Office Action, issued in connection with U.S. Appl. No. 17/944,013, dated Mar. 5, 2024, 18 pages.

*Primary Examiner* — An Son P Huynh

(57) ABSTRACT

Disclosed example audience measurement apparatus determine a first audience metric based on set-top box return path tuning data obtained from set-top boxes located in a first geographic area; determine a second audience metric from a portion of audience measurement data corresponding to a second geographic area, the portion of the audience measurement data associated with monitored sites in the second geographic area having second set-top box characteristics that correspond with first set-top box characteristics of the set-top boxes located in the first geographic area; determine ratios of (i) respective first audience metrics determined for respective demographic stratifications to (ii) corresponding second audience metrics determined for the respective demographic stratifications; and combine the ratios after multiplication with third audience metrics determined, for the respective demographic stratifications, from the audience measurement data to determine an audience exposure metric that estimates exposure to media in the first geographic area.

17 Claims, 9 Drawing Sheets

Related U.S. Application Data continuation of application No. 17/982,200, filed on Nov. 7, 2022, now Pat. No. 12,081,832, which is a continuation of application No. 17/397,601, filed on Aug. 9, 2021, now Pat. No. 11,496,799, which is a continuation of application No. 16/786,519, filed on Feb. 10, 2020, now Pat. No. 11,089,361, which is a continuation of application No. 15/891,076, filed on Feb. 7, 2018, now Pat. No. 10,560,740, which is a continuation of application No. 15/416,790, filed on Jan. 26, 2017, now Pat. No. 9,900,655, which is a continuation of application No. 15/207,054, filed on Jul. 11, 2016, now Pat. No. 9,578,361, which is a continuation of application No. 13/078,574, filed on Apr. 1, 2011, now Pat. No. 9,420,320.

(51) Int. Cl.

| | |
|---|---|
| ***H04H 60/66*** | (2008.01) |
| ***H04N 21/258*** | (2011.01) |
| ***H04N 21/41*** | (2011.01) |
| ***H04N 21/438*** | (2011.01) |
| ***H04N 21/45*** | (2011.01) |
| *H04H 60/51* | (2008.01) |

(52) U.S. Cl.

CPC . *H04N 21/25841* (2013.01); *H04N 21/25866* (2013.01); *H04N 21/4104* (2013.01); *H04N 21/4112* (2020.08); *H04N 21/4383* (2013.01); *H04N 21/4524* (2013.01); *H04H 60/51* (2013.01)

(56) References Cited

U.S. PATENT DOCUMENTS

| | | | |
|---|---|---|---|
| 2020/0226465 | A1 | 7/2020 | Harrington et al. |
| 2023/0096891 | A1 | 3/2023 | Tucker |
| 2023/0222525 | A1 | 7/2023 | Sheppard et al. |
| 2024/0144323 | A1 | 5/2024 | Tucker et al. |

705

Weighting and Factoring Variants: Worked Examples

| | |
|---|---|
| These examples show a hypothetical calculation of an individual quarter hour rating for a single demo & network/station | Universe (NPM) 64000 |
| **1. Simple Weighting and Factoring (WAF)** | Universe (Local) 480 |
| Overview: weight national data to local, then adjust the ratings using local STB data as a guide | Cutback/STB 25 |

*Note: NPM cutback is a subset of homes/devices designed to match the STB sample definition as closely as possible*

| | | NPM Audience (Demo) | NPM Audience after weighting to local | NPM Cutback Audience | STB Audience | Factor | WAF Audience (Demo) | | | Min Factor | Max Factor | | | WAF Rating (Demo) |
|---|---|---|---|---|---|---|---|---|---|---|---|---|---|---|
| | | | D | C | S | F = S/C | A = D x S/C | | | L | U | | | |
| | All Households | 640 | 5.66 | 0.49 | 0.64 | 1.32 | **7.47** | | | 0.2 | 4 | | | **1.55601** |

FIG. 7A

710

2. Stratified Weighting and Factoring (SWAF)

Overview: split the sample into strata to address regional demographic differences

| i | Stratum | NPM Audience (Demo) | NPM Audience after weighting to local UE | NPM Cutback Audience | STB Audience | | WAF Audience (Demo) | Local SOW (%) | | Min Factor | Max Factor | | | WAF Rating (Demo) |
|---|---|---|---|---|---|---|---|---|---|---|---|---|---|---|
| | | | Di | Ci | Si | Fi = Si/Ci | A = sum(Di x Fi) | | | Li | Ui | | | |
| 0 | All Households | 640 | 5.66 | 0.49 | 0.64 | | **7.39** | 100 | | 0.2 | 4 | | | **1.54** |
| 1 | AOH 18-34 | 288 | 2.40 | 0.23 | 0.38 | 1.67 | 4.00 | 50 | | 0.3 | 4 | | | |
| 2 | AOH 35-54 | 211 | 2.22 | 0.15 | 0.17 | 1.10 | 2.44 | 30 | | 0.1 | 5 | | | |
| 3 | AOH 55+ | 128 | 1.04 | 0.11 | 0.10 | 0.91 | 0.95 | 20 | | 0.05 | 6 | | | |

FIG. 7B

715

3. Amplified Stratified Weighting and Factoring (ASWAF)

Overview: amplify the stratified factors to compensate for regression to mean

| i | Stratum | NPM Audience (Demo) | NPM Audience after weighting to local UE (Demo) | NPM Cutback Audience | STB Audience | Factor | WAF Audience (Demo) | Local SOW (%) | Amplified Factor | Min Factor | Max Factor | Ampl. constant | | WAF Rating (Demo) |
|---|---|---|---|---|---|---|---|---|---|---|---|---|---|---|
| | | | Di | Ci | Si | Fi = Si/Ci | A = sum(Di x Adj(Fi)) | | Adj(Fi) | Li | Ui | k | | |
| 0 | All Households | 640 | 5.66 | 0.49 | 0.64 | 1.32 | **9.78** | 100 | | 0.2 | 4 | 4 | | **2.04** |
| 1 | AOH 18-34 | 288 | 2.40 | 0.23 | 0.38 | 1.67 | 8.06 | 50 | 3.36 | 0.3 | 4 | | | |
| 2 | AOH 35-54 | 211 | 2.22 | 0.15 | 0.17 | 1.10 | 1.41 | 30 | 0.64 | 0.1 | 5 | | | |
| 3 | AOH 55+ | 128 | 1.04 | 0.11 | 0.10 | 0.91 | 0.31 | 20 | 0.30 | 0.05 | 6 | | | |

FIG. 7C

720

4. Adjusted Stratified Weighting and Factoring (AdjSWAF)

Overview: allows further adjustment to incorporate, e.g., LPM or set meter data, and/or to include dynamic on/off adjustment, etc.

| i | Stratum | NPM Audience (Demo) | NPM Audience after weighting to local UE (Demo) | NPM Cutback Audience | STB Audience | Factor | WAF Audience (Demo) | Local SOW (%) | Amplified Factor | Min Factor | Max Factor | Ampl. constant | Adjust. | WAF Rating (Demo) |
|---|---|---|---|---|---|---|---|---|---|---|---|---|---|---|
| | | | Di | Ci | Si | Fi = Si/Ci | A = sum(Di x gi x Adj(Fi)) | | Adj(Fi) | Li | Ui | k | gi | |
| 0 | All Households | 640 | 5.66 | 0.49 | 0.64 | 1.32 | **6.89** | 100 | | 0.2 | 4 | 4 | | **1.43** |
| 1 | AOH 18-34 | 288 | 2.40 | 0.23 | 0.38 | 1.67 | 5.64 | 50 | 2.35 | 0.3 | 4 | | 0.70 | |
| 2 | AOH 35-54 | 211 | 2.22 | 0.15 | 0.17 | 1.10 | 1.06 | 30 | 0.48 | 0.1 | 5 | | 0.75 | |
| 3 | AOH 55+ | 128 | 1.04 | 0.11 | 0.10 | 0.91 | 0.19 | 20 | 0.18 | 0.05 | 6 | | 0.60 | |

FIG. 7D

805

Weighting and Factoring Variants: Worked Examples

| | |
|---|---|
| These examples show a hypothetical calculation of an individual quarter hour rating for a single demo and network/station | Universe (NPM) 64000 |
| **1. Simple Weighting and Factoring (WAF)** | Universe (Local) 480 |
| Overview: weight national data to local, then adjust the ratings using local STB data as a guide | Cutback/STB 25 |

*Note: NPM cutback is a subset of homes/devices designed to match the STB sample definition as closely as possible*

| | | NPM Rating (Demo) | NPM Rating after weighting to local | NPM Cutback Rating | STB Rating | Factor | WAF Rating (Demo) | | | Min Factor | Max Factor | | | WAF Audience (Demo) |
|---|---|---|---|---|---|---|---|---|---|---|---|---|---|---|
| | | | D | C | S | F = S/C | R = D x F | | | L | U | | | |
| | All Households | 1.00 | 1.18 | 1.94 | 2.56 | 1.32 | **1.56** | | | 0.2 | 4 | | | **7.47** |

FIG. 8A

810

2. Stratified Weighting and Factoring

Overview: split the sample into strata to address regional demographic differences

| i | Stratum | NPM Rating (Demo) | NPM Rating after weighting to local UE | NPM Cutback Rating | STB Rating | | WAF Rating (Demo) | Local SOW (%) | | Min Factor | Max Factor | | | WAF Audience (Demo) |
|---|---|---|---|---|---|---|---|---|---|---|---|---|---|---|
| | | | Di | Ci | Si | Fi = Si/Ci | R = sum(Di x Fi x Pi/100) | Pi | | Li | Ui | | | |
| 0 | All Households | 1.00 | 1.18 | 1.94 | 2.56 | | **1.54** | 100 | | 0.2 | 4 | | | **7.39** |
| 1 | AOH 18-34 | 0.90 | 1.00 | 1.80 | 3.00 | 1.67 | 1.67 | 50 | | 0.3 | 4 | | | |
| 2 | AOH 35-54 | 1.10 | 1.54 | 2.00 | 2.20 | 1.10 | 1.70 | 30 | | 0.1 | 5 | | | |
| 3 | AOH 55+ | 1.00 | 1.08 | 2.20 | 2.00 | 0.91 | 0.98 | 20 | | 0.05 | 6 | | | |

FIG. 8B

815

3. Amplified Stratified Weighting and Factoring

Overview: amplify the stratified factors to compensate for regression to mean

| i | Stratum | NPM Rating (Demo) | NPM Rating after weighting to local UE (Demo) | NPM Cutback Rating | STB Rating | Factor | WAF Rating (Demo) | Local SOW (%) | Amplified Factor | Min Factor | Max Factor | Ampl. constant | | WAF Audience (Demo) |
|---|---|---|---|---|---|---|---|---|---|---|---|---|---|---|
| | | | Di | Ci | Si | Fi = Si/Ci | R = sum(Di x Adj(Fi) x Pi/100) | Pi | Adj(Fi) | Li | Ui | k | | |
| 0 | All Households | 1.00 | 1.18 | 1.94 | 2.56 | 1.32 | **2.04** | 100 | | 0.2 | 4 | 4 | | **9.78** |
| 1 | AOH 18-34 | 0.90 | 1.00 | 1.80 | 3.00 | 1.67 | 3.36 | 50 | 3.36 | 0.3 | 4 | | | |
| 2 | AOH 35-54 | 1.10 | 1.54 | 2.00 | 2.20 | 1.10 | 0.98 | 30 | 0.64 | 0.1 | 5 | | | |
| 3 | AOH 55+ | 1.00 | 1.08 | 2.20 | 2.00 | 0.91 | 0.32 | 20 | 0.30 | 0.05 | 6 | | | |

FIG. 8C

820

4. Adjusted Stratified Weighting and Factoring

Overview: allows further adjustment to incorporate, e.g., LPM or set meter data, and/or to include dynamic on/off adjustment, etc.

| i | Stratum | NPM Rating (Demo) | NPM Rating after weighting to local UE (Demo) | NPM Cutback Rating | STB Rating | Factor | WAF Rating (Demo) | Local SOW (%) | Amplified Factor | Min Factor | Max Factor | Ampl. constant | Adjust. | WAF Audience (Demo) |
|---|---|---|---|---|---|---|---|---|---|---|---|---|---|---|
| | | | Di | Ci | Si | Fi = Si/Ci | R = sum(Di x gi x Adj(Fi) x Pi/100) | Pi | Adj(Fi) | Li | Ui | k | gi | |
| 0 | All Households | 1.00 | 1.18 | 1.94 | 2.56 | 1.32 | **1.43** | 100 | | 0.2 | 4 | 4 | | **6.89** |
| 1 | AOH 18-34 | 0.90 | 1.00 | 1.80 | 3.00 | 1.67 | 3.36 | 50 | 3.36 | 0.3 | 4 | | 0.70 | |
| 2 | AOH 35-54 | 1.10 | 1.54 | 2.00 | 2.20 | 1.10 | 0.98 | 30 | 0.64 | 0.1 | 5 | | 0.75 | |
| 3 | AOH 55+ | 1.00 | 1.08 | 2.20 | 2.00 | 0.91 | 0.32 | 20 | 0.30 | 0.05 | 6 | | 0.60 | |

FIG. 8D

METHODS, APPARATUS AND ARTICLES OF MANUFACTURE TO ESTIMATE LOCAL MARKET AUDIENCES OF MEDIA CONTENT

CROSS-REFERENCE TO RELATED APPLICATIONS

This disclosure is a continuation of U.S. patent application Ser. No. 18/508,917 (now U.S. Pat. No. 12,267,554), which was field on Nov. 14, 2023, which is a continuation of U.S. patent application Ser. No. 17/982,200 (now U.S. Pat. No. 12,081,832), which was filed on Nov. 7, 2022, which is a continuation of U.S. patent application Ser. No. 17/397,601 (now U.S. Pat. No. 11,496,799), which was filed on Aug. 9, 2021, which is a continuation of U.S. patent application Ser. No. 16/786,519 (now U.S. Pat. No. 11,089,361), which was filed on Feb. 10, 2020, which is a continuation of U.S. patent application Ser. No. 15/891,076 (now U.S. Pat. No. 10,560,740), which was filed on Feb. 7, 2018, which is a continuation of U.S. patent application Ser. No. 15/416,790 (now U.S. Pat. No. 9,900,655), which was filed on Jan. 26, 2017, which is a continuation of U.S. patent application Ser. No. 15/207,054 (now U.S. Pat. No. 9,578,361), which was filed on Jul. 11, 2016, which is a continuation of U.S. patent application Ser. No. 13/078,574 (now U.S. Pat. No. 9,420,320), which was filed on Apr. 1, 2011, each of which is hereby incorporated by reference in its entirety.

FIELD OF THE DISCLOSURE

This disclosure relates generally to audience measurement and, more particularly, to methods, apparatus and articles of manufacture to estimate local market audiences of media content.

BACKGROUND

Currently, there are 210 designated market areas (DMAs) for television audience measurement in the United States, ranging in size from several million households (e.g., New York, NY) to a few thousand households (e.g., Zanesville, OH). DMAs are also referred to as local markets. For economic reasons, local market audience measurement typically relies on local audience measurement data having smaller sample sizes than national-level audience measurement data, and/or that is collected using less expensive, and potentially less accurate, measurement techniques (e.g., such as via diaries rather than automated people meters). More recently, return path data collected, measured and/or provided by cable and/or satellite set-top boxes offers an alternative method to measure audiences of media content.

BRIEF DESCRIPTION OF THE DRAWINGS

FIGS. 7A-D and 8A-D illustrates example local market audience exposure metrics determined by the example local market audience estimation system of FIG. 1 for an example local market.

DETAILED DESCRIPTION

Figure 1:
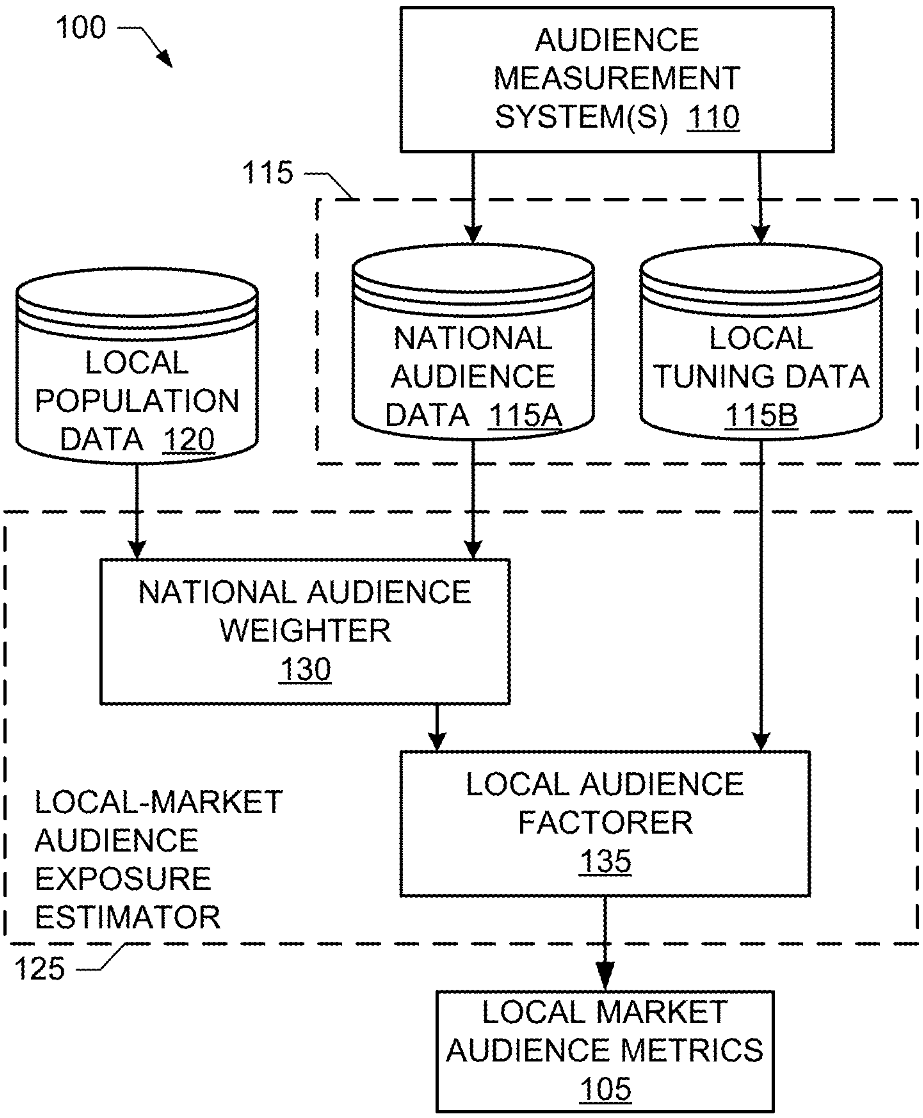
FIG. 1 is an example local market audience estimation system including an example local market audience exposure estimator constructed in accordance with the teachings of this disclosure.

Example methods, apparatus and articles of manufacture to estimate local market audiences of media content are disclosed herein. An example method disclosed herein determines a local audience exposure metric estimating exposure to media content in a local market. The local audience exposure metric can correspond to, for example, a local audience population estimate estimating a number of persons in the local market that have been exposed to the media context, or a local audience ratings estimate estimating a percentage of persons in the local market that have been exposed to the media content, etc. The example method includes weighting national audience measurement data based on local population data to form weighted data. The example method also includes factoring (e.g., scaling or otherwise processing based on one or more factors) the weighted data based on the national audience measurement data and local tuning data to determine the local audience exposure metric.

In some examples, weighting the national audience measurement data comprises weighting the national audience measurement based on a target demographic group represented in the local population data, and also one or more of a target program, a target date, a target time-of-day, etc. In some examples, the local tuning data is local set-top box return path tuning data, and factoring the weighted data includes determining a factor corresponding to a ratio of a first audience metric determined from the local set-top box return path tuning data and a second audience metric determined from a cutback portion of the national audience measurement data, and then scaling a third audience metric determined from the weighted data based on the factor to determine the local audience exposure metric. In some examples, these first, second and third audience metrics are respective first, second and third audience population estimates, or respective first, second and third audience ratings estimates, etc. In some examples, the cutback portion of the national audience measurement data corresponds to a portion of the national audience measurement data associated with monitored sites having set-top box characteristics substantially similar to the local set-top box return path tuning data. Other examples of factoring the weighted data are also described hereinbelow.

A disclosed example apparatus to determine a local audience exposure metric estimating exposure to media content in a local market includes an example national exposure weighter to weight national audience measurement data based on local population data to form weighted data. The example apparatus also includes an example local audience factorer to factor (e.g., to scale or otherwise process based on one or more factors) the weighted data based on the national audience measurement data and local tuning data to determine the local audience exposure metric. In some examples, the national exposure weighter includes an example sampler to select a subset of the national audience measurement data, and an example weighter to weight the subset based on a target demographic group represented in the local population data, and also one or more of a target program, a target date, a target time-of-day, etc. In some examples, the local tuning data is local set-top box return path tuning data, and the example local audience factorer includes: (1) an example characterizer to impute characteristics of the local set-top box return path tuning data; (2) an example cutback indicator to add cutback indicators to the weighted data; (3) a first example estimator to compute a demographic audience metric using the weighted data; (4) a second example estimator to compute a cutback audience metric using a portion of the weighted data having a cutback indicator selected based on the local set-top box return path tuning data; (5) a third example estimator to compute a set-top box audience metric using the local set-top box return path tuning data; and (4) a fourth example estimator to combine the demographic audience metric, the cutback audience metric and the set-top box audience metric to form the local audience exposure metric.

While return path data may be relatively inexpensive to obtain and/or may enable the collection of relatively large quantities of audience measurement data, return path data can be biased and/or incomplete. With respect to incompleteness, return path data may, for example, exclude sections of the population (e.g., such as excluding non-subscribers to a particular digital service providing the return path data), lack demographic attributes, lack on/off indicators for the media presentation device coupled with the set-top box providing the return path data, lack information pertaining to which persons are in the viewing area and/or lack information regarding media content viewing/consumption on devices in a subscriber's households not associated with the set-top box. In contrast, traditional sample-based audience measurement techniques (e.g., diaries and/or automated people meters) have comparatively higher costs and/or comparatively smaller sample sizes, but are substantially less biased and provide substantially more complete data.

The example methods, apparatus and articles of manufacture to estimate local market audiences of media content disclosed herein overcome at least some of the limitations associated with local market audience measurement based on just return path data or just traditional sample-based audience measurement techniques. The examples disclosed herein leverage the strengths of return path data (e.g., large sample size and low cost) and sample-based research (e.g., unbiased and complete) to obtain, at least under some circumstances, unbiased, detailed and continuous estimates of local market audiences at an affordable cost. As described in greater detail below, the examples disclosed herein estimate local market audiences using a statistical combination of national sample-based audience measurement data, local return path data (or, more generally, local tuning data), and local population and/or demographic data.

FIG. 1 illustrates an example local market audience estimation system 100 to estimate, form, compute and/or otherwise generate local market audience measurement metrics 105 characterizing exposure to media content in one or more local markets. The media content for which local market audience measurement metrics 105 are to be determined can correspond to any type of media content, such as television, cable and/or satellite broadcast programming, video-on-demand programming, radio broadcast programming, online/streaming media content, etc. Any number and/or type(s) of television audience measurement system(s) 110 can be used to collect, measure and/or otherwise obtain example data 115 representing audiences of media content. The television audience measurement system(s) 110 can obtain the audience measurement data via, for example, people meters operating in statistically-selected households, set-top boxes and/or other media devices (e.g., such as digital video recorders, personal computers, tablet computer, smartphones, etc.) capable of monitoring and returning monitored data for media content presentations, etc. In some examples, the audience measurement system(s) 110, as well as the local market television audience estimation system 100, are used by advertisers and/or content providers to measure and/or establish with scientific and/or verifiable accuracy the reach of their advertising campaigns and/or media content.

As illustrated in FIG. 1, the example audience measurement system(s) 110 obtain the example data 115 representative of audiences of media content during one or more survey time periods. The example data 115 of FIG. 1 includes national audience measurement data 115A collected and/or obtained from, for example, people meters and/or other techniques for measuring a national audience of media content, and local tuning data 115B collected and/or obtained from, for example, return path data provided by cable and/or satellite set-top boxes (STBs) and/or other media devices. In the illustrated example of FIG. 1, the national audience data 115 is assumed to include audience demographic information and to characterize person-level exposure to media content. In contrast, the local tuning data 115B is assumed to not include audience demographic information and to characterize household-level (or, more specifically, device-level or STB-level) exposure to media content. Furthermore, it is assumed that the amount of local tuning data 115B substantially exceeds the amount of national audience data 115A (or at least the portion of the national audience data 115A that corresponds to a particular local market). The example data 115, 115A and 115B can be implemented by any number and/or type(s) of data structure(s), table(s), list(s) and/or record(s). The data 115, 115A and 115B can be stored on any number and/or type(s) of volatile and/or non-volatile memory(ies), memory device(s) and/or storage device(s).

To provide information representing the population of local markets, the example local market audience estimation system 100 of FIG. 1 includes local population data 120 (also referred to as local universe estimates 120). The example local population data 120 represents the demographics of local markets and can be obtained from any source or combination of sources providing demographic information for the local population(s) for which audience estimation is to be performed. The example local population data 120 can be implemented by any number and/or type(s) of data structure(s), table(s), list(s) and/or record(s). The local population data 120 can be stored on any number and/or type(s) of volatile and/or non-volatile memory(ies), memory device(s) and/or storage device(s).

To generate and/or compute the example local market audience measurement metrics 105, the example local market audience estimation system 100 of FIG. 1 includes a local market audience exposure rater 125. The example local market audience exposure estimator 125 of FIG. 1 statistically combines the national audience measurement data 115A, the local return path data 115B, and the local population and/or demographic data 120 to generate and/or compute the local market television audience metrics 105. In the illustrated example, to perform such statistical combining, the local market audience exposure estimator 125 includes an example national audience weighter 130 and an example local audience factorer 135.

As described in greater detail below, the example national audience weighter 130 of FIG. 1 samples the national audience data 115A and weights the samples national audience data 115A based on the local population data 120 to determine weighted national audience data, also referred to herein as simply weighted data. The weighted data forms an initial estimate of the local audience of the media content. As such, the national audience weighter 130 uses any appropriate weighting technique to weight (e.g., scale, emphasize, deemphasize, etc.) the national audience data 115A based on the demographic information included the national audience data 115A and the local population data 120 such that the resulting weighted data is representative of the demographics of the local market under consideration.

However, audience exposure to media content may be influenced by local characteristics (e.g., such as local preferences, local on-air personalities, etc.) that are not functions of demographics alone. Unlike the national audience data 115A, the local tuning data 115B is obtained by, for example, STB return path data for households in the local market. As such, the local tuning data 115B can reflect the preferences in the local market that are not functions of the demographics alone. However, the local tuning data 115B by itself may be insufficient to characterize the local audience because the local tuning data 115B does not include demographic information, is at the household or device level rather than the person level, and reflects the viewing of only those local sites providing the local tuning data 115B (e.g., such as only those households having STBs capable of providing the return path data forming the local tuning data 115B). Accordingly, and as described in greater detail below, the example local audience factorer 135 of FIG. 1 factors (e.g., scales and/or otherwise processes using one or more factors) the weighted data determined by the national audience weighter 130 (which includes demographic information, is at the person level and represents audience exposure across different media content presentation platforms) based on the local tuning data 115B obtained for the local market under consideration (which can represent local preferences not accounted for by demographics alone) to determine the local market audience metrics 105.

Figure 2:
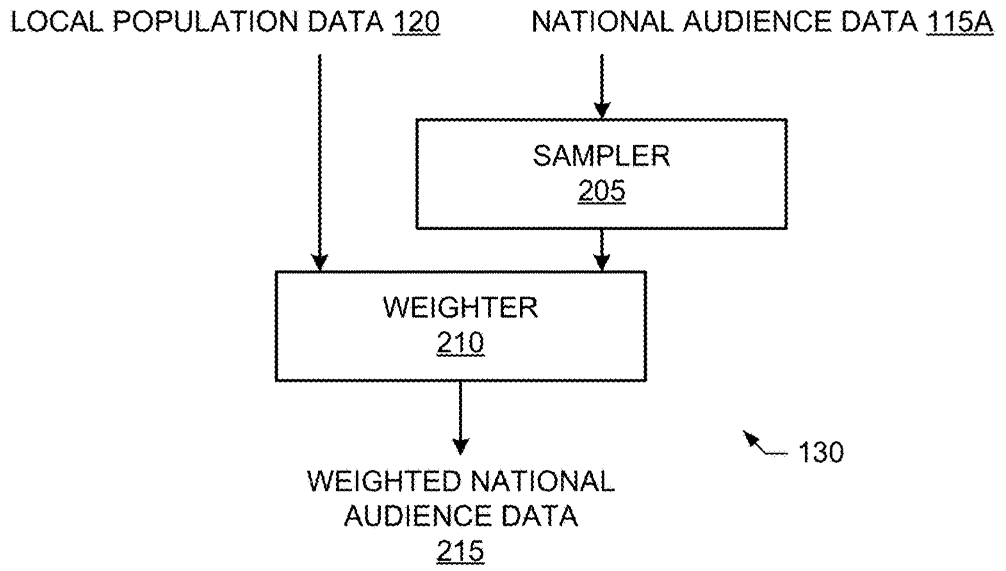
FIG. 2 illustrates an example manner of implementing an example national audience weighter included in the local market audience exposure estimator of FIG. 1.

An example implementation of the national audience weighter 130 of FIG. 1 is illustrated in FIG. 2. The example national audience weighter 130 of FIG. 2 includes an example sampler 205 to sample the national audience measurement data 115A to produce a data subset that is relevant to the local market. For example, the statistically selected panel of households containing the people meters that provide the national audience measurement data 115A can change over time. Thus, the sampler 205 can employ any appropriate sampling technique to sample the national audience measurement data 115A to select only that data corresponding to households in the current statistically selected panel and to exclude data corresponding to obsolete households no longer in the statistically selected panel. Additionally or alternatively, the sampler 205 can employ any appropriate sampling technique to sample only the portions of the national audience measurement data 115A having demographic relevance to the local market under consideration. Other type(s) of data sampling can additionally or alternatively be implemented by the sampler 205.

The example national audience weighter 130 of FIG. 2 also includes an example weighter 210 to weight the sampled national audience measurement data 115A obtained from the sampler 205 to provide an initial estimate of audience measurement data for the local market under consideration. For example, the weighter 210 can use any appropriate technique to statistically weight (e.g., scale, emphasize, deemphasize, etc.) the sampled national audience measurement data 115A to account for differences between the size and/or demographic makeup of the national audience measurement data 115A and the size and/or demographic makeup of the local market as represented by the local population data 120. The result of the weighting performed by the weighter 210 is weighted national audience measurement data 215 that can be used as an initial estimate of the local audience measurement data for the particular local market under consideration.

Figure 3:
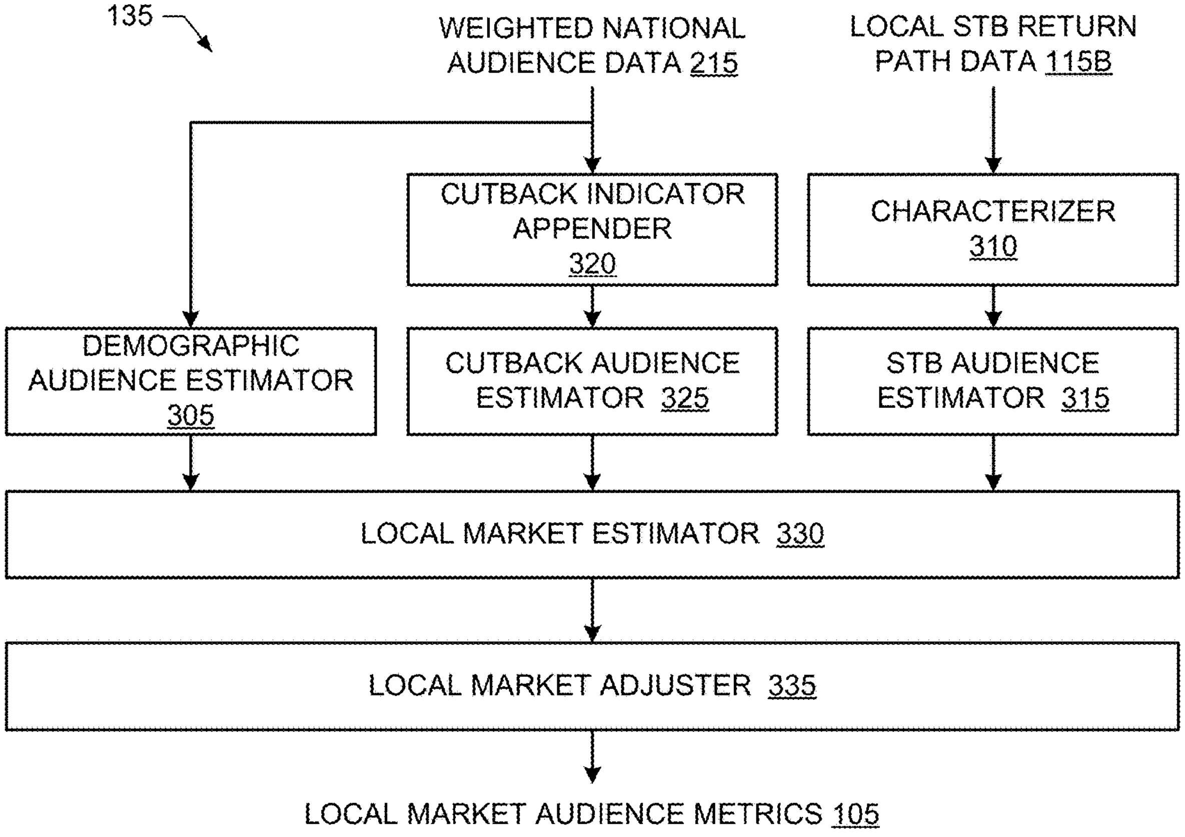
FIG. 3 illustrates an example manner of implementing an example local audience factorer included in the local market audience exposure estimator of FIG. 1.

An example implementation of the local audience factorer 135 of FIG. 1 is illustrated in FIG. 3. The example local audience factorer 135 of FIG. 3 uses the weighted national audience measurement data 215 determined by the weighter 130 of FIG. 2 and the local tuning data 115B (e.g., which is local STB return path data 115B in the illustrated example) to determine the local market audience metrics 105. In the illustrated example of FIG. 3, the local audience factorer 135 includes an example demographic audience estimator 305 to determine (e.g., compute) an initial demographic audience metric from the weighted national audience measurement data 215 for a particular demographic stratification. For example, for a particular demographic stratification, i, the corresponding initial demographic audience metric, $D_i$, determined by the demographic audience estimator 305 can correspond to an audience population estimate estimating a number of persons in the local market and the particular demographic stratification, i, that have been exposed to the media context. As another example, for a particular demographic stratification, i, the corresponding initial demographic audience metric, $D_i$, determined by the demographic audience estimator 305 can correspond to an audience ratings estimate estimating a percentage of persons in the local market and the particular demographic stratification, i, that have been exposed to the media content, etc. Examples of demographic stratifications include, but are not limited to, gender stratifications, age stratifications, income stratifications, etc., and/or any combination(s) thereof.

The local audience factorer 135 also includes an example characterizer 310 and an example STB audience estimator 315 to determine a first factor to be used to factor the weighted national audience data 215 to determine the local market audience metrics 105. In the illustrated example, the characterizer 310 is to impute characteristics of the local STB return path tuning data 115B. As noted above, the local STB return path tuning data 115B (or, more generally, the local tuning data 115B) generally does not include demographic information. As such, to enable the local STB return path tuning data 115B to be used to factor the weighted national audience data 215 for a particular demographic stratification, the characterizer 310 adds demographic information to the local STB return path tuning data 115B. The characterizer 310 can employ any appropriate technique or techniques to add demographic information to the local STB return path tuning data 115B. For example, the characterizer 310 can add demographic information obtained from surveys and/or other sources of information for the households containing the STBs providing the local STB return path tuning data 115B. Additionally or alternatively, the characterizer 310 can bootstrap the demographic information by inferring the demographic information for a particular household based on the types of media content included in the STB return path tuning data 115B for that household.

The STB audience estimator 315 of FIG. 3 determines (e.g., computes) an STB audience metric from the local STB return path data 115B for a particular demographic stratification. For example, for a particular demographic stratification, i, the corresponding STB audience metric, $S_i$, determined by the STB audience estimator 315 can correspond to an audience population estimate estimating a number of households among the households represented in the STB return path data 115B and in the particular demographic stratification, i, that have been exposed to the media context. As another example, for a particular demographic stratification, i, the corresponding STB audience metric, $S_i$, determined by the STB audience estimator 315 can correspond to an audience ratings estimate estimating a percentage of households among the households represented in the STB return path data 115B and in the particular demographic stratification, i, that have been exposed to the media content, etc.

The local audience factorer 135 further includes an example cutback indicator appender 320 and an example cutback audience estimator 325 to determine a second factor to be used to factor the weighted national audience data 215 to determine the local market audience metrics 105. The STB audience metric determined by the STB audience estimator 315 in combination with the characterizer 320 represents, for example, local media content preferences that are not accounted for by demographics alone, which can be used to modify the initial demographic audience metric, $D_i$, determined from the weighted national audience measurement data 215. However, the STB audience metric is based on data obtained from only a subset of the local audience households containing the particular type(s) of STB equipment providing the return path data. Thus, to determine a factor for adjusting the initial demographic audience metric, $D_i$, based on the STB audience metric $S_i$, the cutback indicator appender 320 and the cutback audience estimator 325 determine a cutback audience metric from only those portion(s) the weighted national audience data 215 associated with type(s) of STB equipment substantially similar to that associated with the local STB return path data 115B. Selection of the appropriate portion of the weighted national audience data 215 associated with a particular type of STB equipment is facilitated by the use of cutback indicators. A cutback indicator represents a particular (e.g., unique) type of STB equipment or set of STB characteristics. Accordingly, the cutback indicator appender 320 appends cutback indicators to the weighted national audience data 215 to indicate the type of STB equipment or set of STB characteristics associated with entries in the weighted national audience data 215.

The cutback audience estimator 325 of FIG. 3 determines (e.g., computes) a cutback audience metric from the weighted national audience data 215 for a particular demographic stratification and particular cutback category associated with the local return path data 115B. For example, for a particular demographic stratification, i, the corresponding cutback audience metric, $C_i$, determined by the cutback audience estimator 325 can correspond to an audience population estimate estimating a number of households among the households in the weighted national audience data 215 having the same type of STB equipment or set of STB characteristics as the local return path data 115B and in the particular demographic stratification, i, that have been exposed to the media context. As another example, for a particular demographic stratification, i, the corresponding cutback audience metric, $C_i$, determined by the cutback audience estimator 325 can correspond to an audience ratings estimate estimating a percentage of households among the households in the weighted national audience data 215 having the same type of STB equipment or set of STB characteristics as the local return path data 115B and in the particular demographic stratification, i, that have been exposed to the media content, etc.

In the illustrated example of FIG. 3, the local audience factorer 135 includes an example local market estimator 330 to process the demographic audience metric, $D_i$, the STB audience metric, $S_i$, and the cutback audience metric, $C_i$, described above to determine factor(s) for use in factoring the weighted national audience data 215 to determine the local market audience metrics 105. In some examples, for a particular demographic stratification, the local audience factorer 135 scales the initial demographic audience metric, $D_i$, by a factor that is a ratio of the STB audience metric, $S_i$, and the cutback audience metric, $C_i$ to determine a local market audience metric for this particular demographic stratification, i. Mathematically, the factoring (e.g., scaling) performed by the local market estimator 330 to determine a local market audience metric, $A_i$, for a particular demographic stratification, i, is represented by Equation 1:

$$A_i = D_i F_i = D_i\left(\frac{S_i}{C_i}\right) \quad \text{Equation 1}$$

In Equation 1, the factor $F_i=S_i/C_i$ factors (e.g., scales) the initial demographic audience metric, $D_i$, to account for local characteristics that are not a function of demographics alone. The examples disclosed herein are not limited to any particular technique(s) for determining the demographic audience metric(s), $D_i$, the STB audience metric(s), $S_i$, and the cutback audience metric(s), $C_i$.

In some examples, the local market estimator 330 determines an overall (also referred to as integrated) local market audience metric, A, by summing the local market audience metric(s), $A_i$, for all appropriate demographic stratifications represented in the local market. Mathematically, this is represented by Equation 2:

$$A = \sum_i A_i = \sum_i D_i F_i = \sum_i D_i\left(\frac{S_i}{C_i}\right) \quad \text{Equation 2}$$

In some examples, the local audience factorer 135 can restrict the factor $F_i$ to be within upper and lower limits $U_i$ and $L_i$, respectively, which may be the same or different for different demographic stratifications. These upper and lower limits can prevent excessive variation in the factor $F_i$ that may occur, for example, if $C_i$ is very small, resulting in an unrealistically large value of $F_i$.

In some examples, the local market audience metric, $A_i$, is determined based on rewriting Equation 1 as Equation 3:

$$A_i = D_i\left(\frac{S_i}{C_i}\right) = S_i\left(\frac{D_i}{C_i}\right) = S_i\left(\frac{D_i}{P}\right)\left(\frac{P}{H_t}\right)\left(\frac{H_t}{C_i}\right) \quad \text{Equation 3}$$

In Equation 3, the quantity $D_i/P$ is an audience participation factor, the quantity $P/H_t$ is an audience member per household factor, and the quantity $H_t/C_i$ is a total households against cutback rating factor. In some examples, the local audience factorer 135 determines the local market audience metric, $A_i$, based on the quantities in Equation 3 instead of directly via Equation 1 to, for example, enable one or more of these quantities to be subjected to limits reflecting the particular audience measurement environment.

In some examples, the local audience factorer 135 includes an example local market adjuster 335 to adjust determination of the local market audience metrics 105 based on information, such as local audience measurement data, different from and in addition to the local STB return path data 115B (or, more generally, the local tuning data 115B). For example, such additional information can include local audience measurement data obtained from people meters and/or similar audience measurement equipment for the particular local market, on/off indicators to indicate whether media presentation devices (e.g., televisions) coupled to the STBs providing the return path data 115B are turned on or off, etc. For example, the local market adjuster 335 can determine the local market audience metric, $A_i$, for a particular demographic stratification, i, by adjusting and/or scaling the factor $F_i$ as represented by Equation 4:

$$A_i = D_i \times (g_i \times adj(F_i)) = D_i \times \left(g_i \times adj\left(\frac{S_i}{C_i}\right)\right) \quad \text{Equation 4}$$

In Equation 4, the quantity $g_i$ represents a gain to be used to scale the factor $F_i$, and the function adj(•) represents an adjustment to be performed on the factor $F_i$. For example, the function adj(•) can involve raising the factor $F_i$ to a power to, for example, enhance differences between the local market audience metrics, $A_i$, for different demographic stratifications. The examples disclosed herein are not limited to any particular technique(s) for determining the gain $g_i$ and/or the adjustment function adj(•).

In some examples, the local market adjuster 335 determines an overall (also referred to as integrated) local market audience metric, A, by summing, after adjustment, the local market audience metric, $A_i$, for all appropriate demographic stratifications represented in the local market. Mathematically, this is represented by Equation 5:

$$A = \sum_i A_i = \sum_i D_i \times (g_i \times adj(F_i)) = \sum_i D_i \times \left(g_i \times adj\left(\frac{S_i}{C_i}\right)\right) \quad \text{Equation 5}$$

Although the preceding examples refer to STB return path data and associated STB audience metric estimation, the examples disclosed herein are not limited thereto. For example, the STBs referred to above can be replaced by any media device or devices capable of providing media content and reporting media contact measurement data associated therewith.

While example manners of implementing the local market audience exposure rater 125, the example national audience weighter 130 and the example local audience factorer 135 of FIG. 1 have been illustrated in FIGS. 1-3, one or more of the elements, processes and/or devices illustrated in FIGS. 1-3 may be combined, divided, re-arranged, omitted, eliminated and/or implemented in any other way. Further, the example sampler 205, the example weighter 210, the example demographic audience estimator 305, the example characterizer 310, the example STB audience estimator 315, the example cutback indicator appender 320, the example cutback audience estimator 325, the example local market estimator 330, the example local market adjuster 335 and/or, more generally, the example national audience weighter 130, the example local audience factorer 135 and/or the example local market audience exposure rater 125 of FIGS. 1-3 may be implemented by hardware, software, firmware and/or any combination of hardware, software and/or firmware. Thus, for example, any of the example sampler 205, the example weighter 210, the example demographic audience estimator 305, the example characterizer 310, the example STB audience estimator 315, the example cutback indicator appender 320, the example cutback audience estimator 325, the example local market estimator 330, the example local market adjuster 335 and/or, more generally, the example national audience weighter 130, the example local audience factorer 135 and/or the example local market audience exposure rater 125 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example local market audience exposure rater 125, the example national audience weighter 130, the example local audience factorer 135, the example sampler 205, the example weighter 210, the example demographic audience estimator 305, the example characterizer 310, the example STB audience estimator 315, the example cutback indicator appender 320, the example cutback audience estimator 325, the example local market estimator 330 and/or the example local market adjuster 335 are hereby expressly defined to include a tangible computer readable medium such as a memory, digital versatile disk (DVD), compact disk (CD), etc., storing such software and/or firmware. Further still, the example local market audience exposure rater 125, the example national audience weighter 130 and/or the example local audience factorer 135 of FIGS. 1-3 may include one or more elements, processes and/or devices in addition to, or instead of, those illustrated in FIGS. 1-3, and/or may include more than one of any or all of the illustrated elements, processes and devices.

Figure 4:
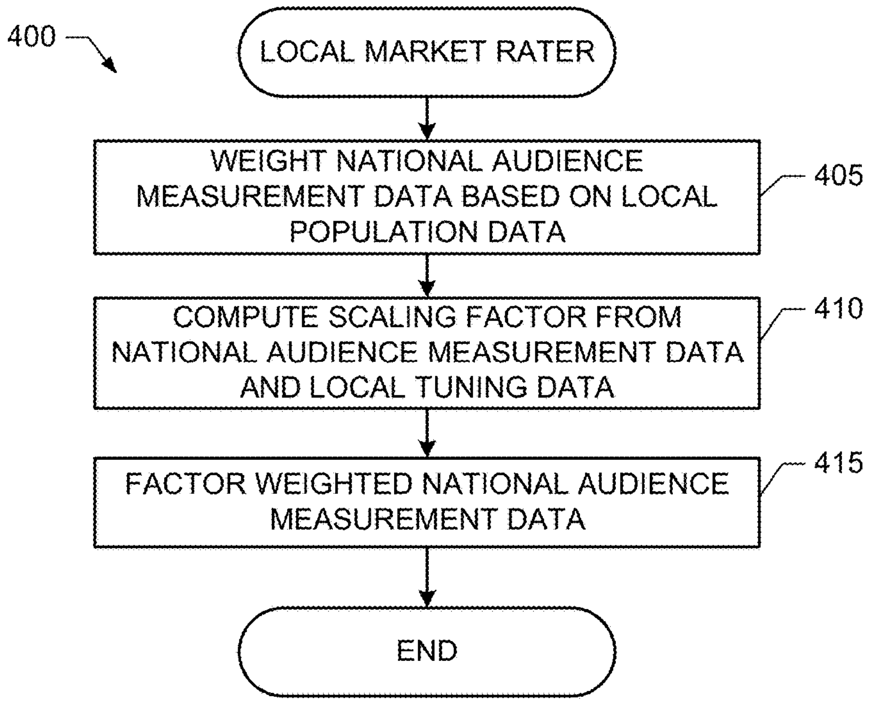
FIG. 4 illustrates an example process that may be implemented using machine-readable instructions executed by one or more processors to implement the example local market audience exposure estimator of FIG. 1.
Figure 5:
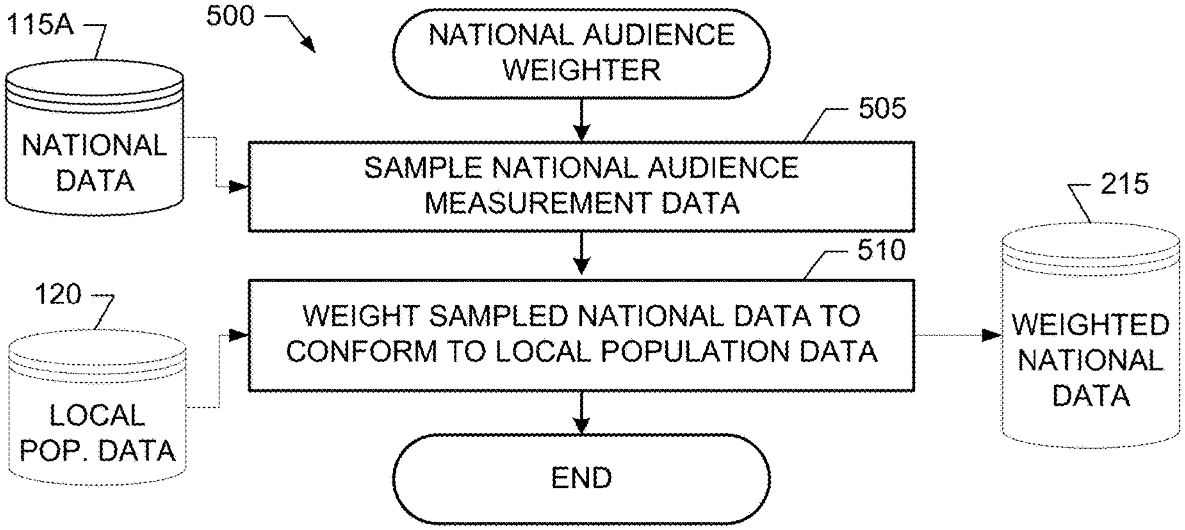
FIG. 5 illustrates an example process that may be implemented using machine-readable instructions executed by one or more processors to implement the example national audience weighter of FIGS. 1 and/or 2.
Figure 6:
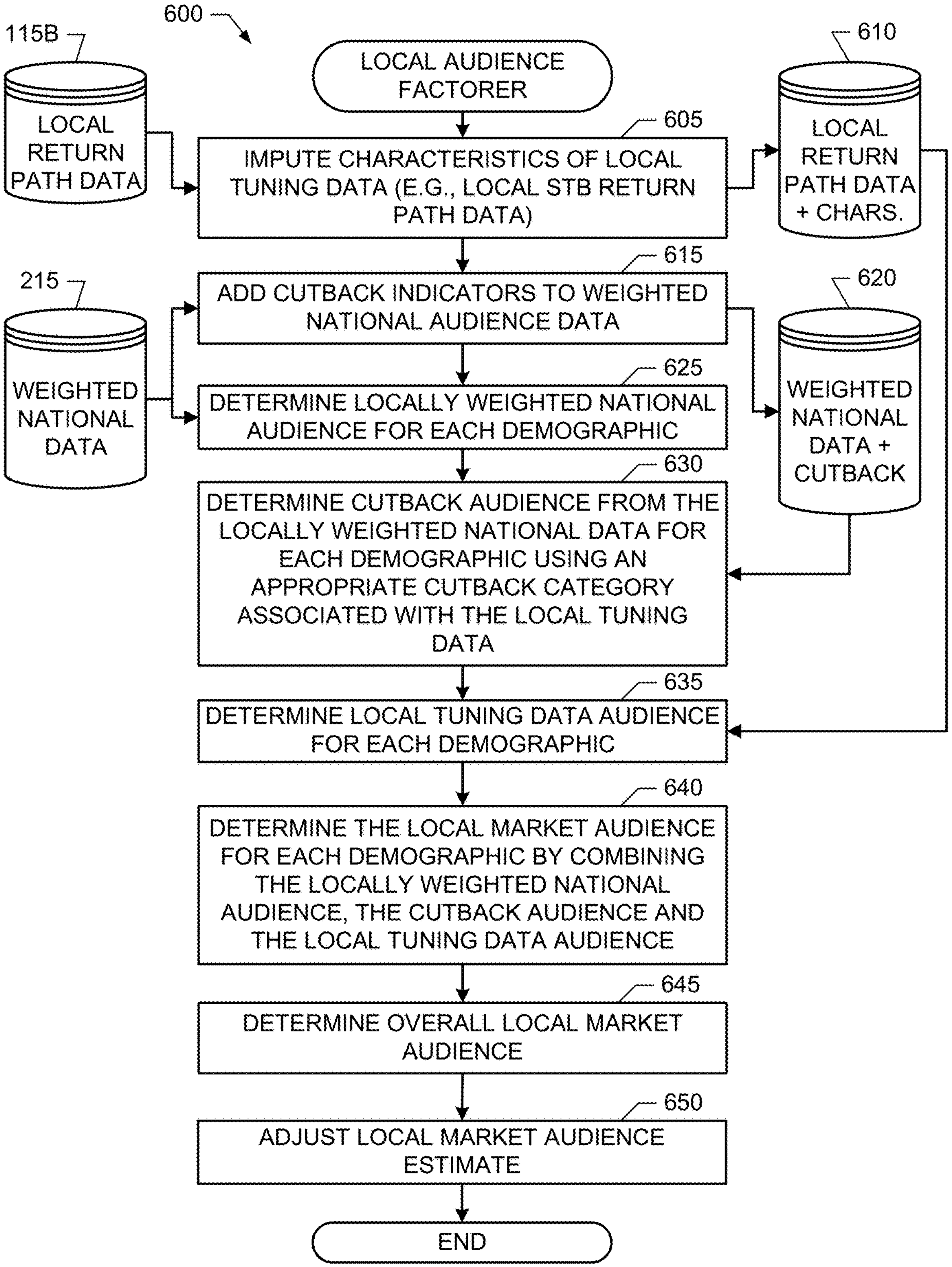
FIG. 6 illustrates an example process that may be implemented using machine-readable instructions executed by one or more processors to implement the example local audience factorer of FIGS. 1 and/or 3.

Flowcharts representative of example processes corresponding to example machine readable instructions that may be executed to implement the example local market audience exposure rater 125, the example national audience weighter 130, the example local audience factorer 135, the example sampler 205, the example weighter 210, the example demographic audience estimator 305, the example characterizer 310, the example STB audience estimator 315, the example cutback indicator appender 320, the example cutback audience estimator 325, the example local market estimator 330 and/or the example local market adjuster 335 are shown in FIGS. 4-6. In these examples, the machine readable instructions represented by each flowchart may comprise one or more programs for execution by a processor, such as the processor 912 shown in the example processing system 900 discussed below in connection with FIG. 9. Alternatively, the entire program or programs and/or portions thereof implementing one or more of the processes represented by the flowcharts of FIGS. 4-6 could be executed by a device other than the processor 912 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 4-6 may be implemented manually. Further, although the example machine readable instructions are described with reference to the flowcharts illustrated in FIGS. 4-6, many other techniques for implementing the example methods and apparatus described herein may alternatively be used. For example, with reference to the flowcharts illustrated in FIGS. 4-6, the order of execution of the blocks may be changed, and/or some of the blocks described may be changed, eliminated, combined and/or subdivided into multiple blocks.

As mentioned above, the example processes of FIGS. 4-6 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4-6 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Example machine readable instructions 400 that may be executed to implement the example local market audience exposure rater 125 of FIG. 1 are represented by the flowchart shown in FIG. 4. With reference to the preceding figures, the machine readable instructions 400 of FIG. 4 begin execution at block 405 at which the national audience weighter 130 included in the local market audience exposure rater 125 weights that national audience measurement data 115A based on the local population data 120 to determine the weighted national audience measurement data 215. As described above, the weighted national audience measurement data 215 can be used as an initial estimate of local audience measurement data for the particular local market under consideration.

At block 410, the local audience factorer 135 included in the local market audience exposure rater 125 computes scaling factor(s) (e.g., F for the overall/integrated population, and/or $F_i$ for one or more demographic stratifications, i) from the national audience measurement data 115A and the local population data 120, as described above. At block 415, the local audience factorer 135 factors (e.g., scales or otherwise processes using factor(s)) the weighted national audience measurement data 215 to determine the local market audience metric(s) 105 for the overall/integrated population and/or one or more demographic stratifications of the local market.

Example machine readable instructions 500 that may be executed to implement the example national audience weighter 130 of FIGS. 1 and 2, and/or the processing at block 405 of FIG. 4, are illustrated in FIG. 5. With reference to the preceding figures, the machine readable instructions 500 of FIG. 5 begin execution at block 505 at which the sampler 205 included in the national audience weighter 130 samples the national audience measurement data 115A to obtain a subset of the data that is relevant to the local market under consideration, as described above. At block 510, the weighter 210 included in the national audience weighter 130 weights the subset of the national audience measurement data 115A obtained at block 505 based on the local population data 120 to determine the weighted national audience measurement data 215, as described above. For example, in the case of determining audience metrics for television programming, at block 510 the national audience weighter 130 can weight the subset of the national audience measurement data 115A to reflect a target demographic group represented in the local population data 120, as well as a target program, a target date on which the program was broadcast, a target time-of-day at which the program was broadcast, etc.

Example machine readable instructions 600 that may be executed to implement the example local audience factorer 135 of FIGS. 1 and 3, and/or the processing at blocks 410-415 of FIG. 4, are illustrated in FIG. 6. With reference to the preceding figures, the machine readable instructions 600 of FIG. 6 begin execution at block 605 at which the characterizer 310 included in the local audience factorer 135 imputes demographic characteristics of the local tuning data 115B, as described above, to yield local tuning data 610 containing demographic characteristics. In the illustrated example, the imputed demographic characteristics correspond to the demographic stratifications present in the local population data 120. At block 615, the cutback indicator appender 320 included in the local audience factorer 135 appends cutback indicators to the weighted national audience measurement data 215, as described above, to yield weighted national audience measurement data 620 containing cutback indicators.

At block 625, the demographic audience estimator 305 included in the local audience factorer 135 determines (e.g., computes) initial demographic audience metric(s), $D_i$, from the weighted national audience measurement data 215 for the overall/integrated population and/or one or more demographic stratifications, i, of the local market, as described above. At block 630, the cutback audience estimator 325 included in the local audience factorer 135 determines (e.g., computes) the cutback audience metric(s), $C_i$, from the weighted national audience measurement data 620 for the overall/integrated population and/or one or more demographic stratifications, i, of the local market, as described above. At block 640, the STB audience estimator 315 included in the local audience factorer 135 determines (e.g., computes) the STB audience metric(s), $S_i$, from the local STB return path data 610 for the overall/integrated population and/or one or more demographic stratifications, i, of the local market, as described above.

At block 640, the local market estimator 330 included in the local audience factorer 135 processes the initial demographic audience metric(s), $D_i$, the cutback audience metric(s), $C_i$, and the STB audience metric(s), $S_i$, determined at blocks 625-635 to determine local market audience metric(s), $A_i$, for one or more demographic stratifications, i, of the local market, as described above. At block 645, the local market estimator 330 determines a local market audience metric, A, by, for example, summing the local market audience metric(s), $A_i$, determined at block 645, as described above. At block 650, the local market adjuster 335 included in the local audience factorer 135 adjusts, if appropriate, the local market audience metric(s) $A_i$ and/or A, as described above.

Example local market audience exposure metrics 105 determined by the example local market audience estimation system 100 of FIG. 1 for an example local market are illustrated in FIGS. 7A-D and 8A-D. Table 705 of FIG. 7A illustrates a first example operation of the local market audience estimation system 100 to determine a local market audience exposure metric 105 that is an overall/integrated local audience population estimate A (e.g., which is equivalent to selecting a single demographic stratification covering the entire local population) for a particular broadcast program and a particular day/time. Table 705 illustrates weighting national audience measurement data (referred to as national people meter (NPM) data in the figures) and calculation of the initial local audience metric (e.g., population estimate), D, from the weighted national audience measurement data. Table 705 also illustrates calculation of the cutback audience metric (e.g., population estimate), C, and the STB audience metric (e.g., population estimate), S, as well as the factor, F=S/C and its upper and lower limits, for the illustrated example. Table 705 further illustrates calculation of the overall/integrated local audience population estimate as A=D×S/C, as described above.

Table 710 of FIG. 7B illustrates a second example operation of the local market audience estimation system 100 to determine local market audience exposure metrics 105 that are local audience population estimates A*i* for three demographic stratifications i. Table 710 illustrates calculation of the initial local audience metrics (e.g., population estimates), $D_i$, the cutback audience metrics (e.g., population estimates), $C_i$, the STB audience metrics (e.g., population estimates), $S_i$, and the factors, $F_i=S_i/C_i$ for the three demographic stratifications i. In the illustrated example, the factors $F_i$ have different upper and lower limits for each demographic stratifications i. Table 710 also illustrates calculation of the local market audience metrics (e.g., population estimates) $A_i$ and A based on Equation 1 and Equation 2.

Table 715 of FIG. 7C illustrates a third example operation of the local market audience estimation system 100 to determine local market audience exposure metrics 105 that are local audience population estimates $A_i$ for three demographic stratifications i, which are adjusted based on an adjustment function adj(•). The operations illustrated in Table 715 are similar to operations illustrated in FIG. 710, except that Table 715 further illustrates adjustment of the factors $F_i$. The adjustment function adj(•) utilized in Table 715 is to raise each factor $F_i$ to an exponent represented by the illustrated amplification constant.

Table 720 of FIG. 7D illustrates a fourth example operation of the local market audience estimation system 100 to determine local market audience exposure metrics 105 that are local audience population estimates $A_i$ for three demographic stratifications i, which are adjusted based on the adjustment function adj(•) of Table 715, as well as gains $g_i$. The operations illustrated in Table 720 are similar to operations illustrated in FIG. 715, except that Table 720 further illustrates multiplying the adjusted factors $F_i$ by the gains $g_i$. In the illustrated example, different gain factors $g_i$ are associated with each demographic stratifications i.

FIGS. 8A-D include Tables 805, 810, 815 and 820 that illustrate example operations of the local market audience estimation system 100 similar to the respective examples of Tables 705, 710, 715 and 720. However, in Tables 805, 810, 815 and 820, the determined local market audience exposure metrics 105 are local audience ratings estimates A and $A_i$, whereas the local market audience exposure metrics 105 determined in Tables 705, 710, 715 and 720 are local audience population estimates A and $A_i$.

Figure 9:
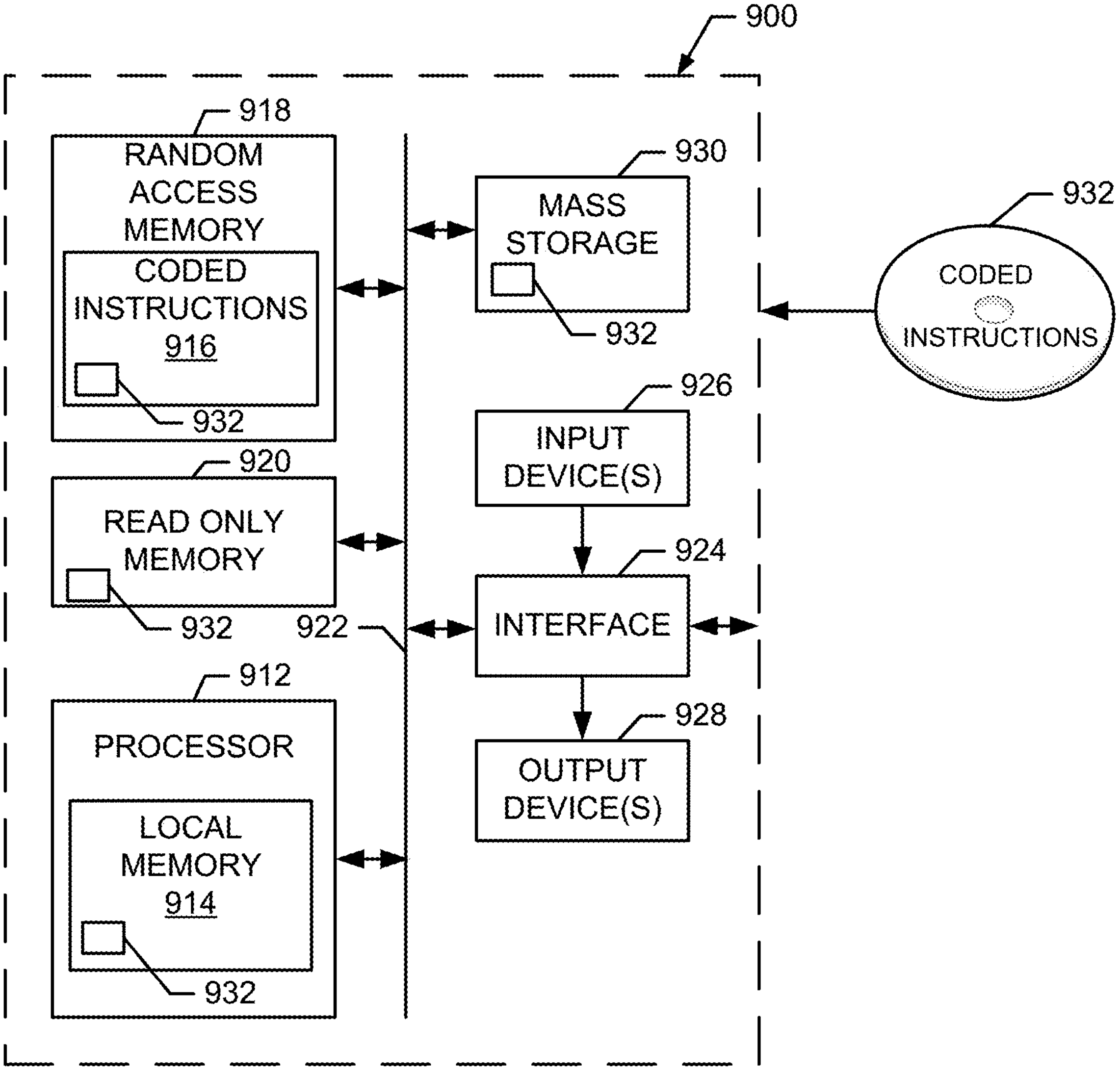
FIG. 9 is a schematic illustration of an example processing system that may be used and/or programmed to implement the example local market audience exposure estimator of FIG. 1, the example national audience weighter of FIGS. 1 and/or 2, the example local audience factorer of FIGS. 1 and/or 3, and/or the example machine-readable instructions of FIGS. 4-6.

FIG. 9 is a block diagram of an example processing system 900 capable of implementing the apparatus and methods disclosed herein. The processing system 900 can be, for example, a server, a personal computer, a personal digital assistant (PDA), an Internet appliance, a DVD player, a CD player, a digital video recorder, a personal video recorder, a set top box, or any other type of computing device.

The system 900 of the instant example includes a processor 912 such as a general purpose programmable processor. The processor 912 includes a local memory 914, and executes coded instructions 916 present in the local memory 914 and/or in another memory device. The processor 912 may execute, among other things, the machine readable instructions represented in FIGS. 4-6. The processor 912 may be any type of processing unit, such as one or more Intel® and/or ARM® microprocessors, and/or one or more PIC® microcontrollers, etc. Of course, other processors from other families are also appropriate.

The processor 912 is in communication with a main memory including a volatile memory 918 and a non-volatile memory 920 via a bus 922. The volatile memory 918 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 920 may be implemented by flash memory and/or any other desired type of memory device. Access to the main memory 918, 920 is typically controlled by a memory controller (not shown).

The processing system 900 also includes an interface circuit 924. The interface circuit 924 may be implemented by any type of interface standard, such as an Ethernet interface, a universal serial bus (USB), and/or a third generation input/output (3GIO) interface.

One or more input devices 926 are connected to the interface circuit 924. The input device(s) 926 permit a user to enter data and commands into the processor 912. The input device(s) can be implemented by, for example, a keyboard, a mouse, a touchscreen, a track-pad, a trackball, an isopoint and/or a voice recognition system.

One or more output devices 928 are also connected to the interface circuit 924. The output devices 928 can be implemented, for example, by display devices (e.g., a liquid crystal display, a cathode ray tube display (CRT)), by a printer and/or by speakers. The interface circuit 924, thus, typically includes a graphics driver card.

The interface circuit 924 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 900 also includes one or more mass storage devices 930 for storing machine readable instructions and data. Examples of such mass storage devices 930 include floppy disk drives, hard drive disks, compact disk drives, digital versatile disk (DVD) drives, flash drives, etc. In some examples, the mass storage device 930 may store one or more of the data 115, 115A, 115B, 120 and/or 215, and/or the local audience metrics 105. Additionally or alternatively, in some examples the volatile memory 918 may store one or more of the data 115, 115A, 115B, 120 and/or 215, and/or the local audience metrics 105.

The coded instructions 932 of FIGS. 4-6 may be stored in the mass storage device 930, in the volatile memory 918, in the non-volatile memory 920, in the local memory 914 and/or on a removable storage medium, such as a CD or DVD 932.

As an alternative to implementing the methods and/or apparatus described herein in a system such as the processing system of FIG. 9, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. A computing system comprising a processor and a memory, the computing system configured to perform a set of operations comprising:

obtaining national audience measurement data indicative of exposure to an item of media content for respective households in a geographic region, wherein the national audience measurement data comprises respective demographic data for the respective households, and wherein the national audience measurement data characterizes person-level exposure to the item of media content;

obtaining local population data for a sub-region of the geographic region, wherein the local population data comprises demographic data for the sub-region;

weighting samples of the national audience measurement data based on the local population data for the sub-region to provide weighted samples of the national audience measurement data;

obtaining, using the weighted samples of the national audience measurement data, an initial audience measurement metric for the sub-region for the item of media content;

obtaining local tuning data indicative of an estimated audience in the sub-region for the item of media content, wherein the local tuning data does not include demographic information and characterizes device-level exposure to the item of media content; and scaling the initial audience measurement metric using the local tuning data so as to determine a local audience measurement metric for the sub-region for the item of media content.

2. The computing system of claim 1, wherein:

the set of operations further comprises sampling the national audience measurement data so as to obtain the samples of the national audience measurement data associated with a subset of the respective households; and weighting the samples of the national audience measurement data comprises weighting the samples of the national audience measurement data using the demographic data for the sub-region to account for a difference between a demographic makeup of the subset of the respective households and a demographic makeup of the sub-region.

3. The computing system of claim 1, wherein:

the local tuning data is obtained from a given type of media device that is located in respective households of the sub-region and reports media content measurement data;

the national audience measurement data comprises device data identifying individual households of the respective households having the given type of media device;

the set of operations further comprises determining a factor based on an amount of households represented within the weighted samples of the national audience measurement data having the given type of media device; and scaling the initial audience measurement metric using the local tuning data comprises scaling the initial audience measurement metric using the factor.

4. The computing system of claim 3, wherein the given type of media device is a given type of set-top box.

5. The computing system of claim 1, wherein:

obtaining the initial audience measurement metric for the sub-region for the item of media content comprises obtaining an initial audience measurement metric for a demographic stratification for the sub-region for the item of media content;

obtaining the local tuning data indicative comprises obtaining local tuning data for the demographic stratification for the sub-region for the item of media content; and the local audience measurement metric for the sub-region for the item of media content is a local audience measurement for the demographic stratification or the sub-region for the item of media content.

6. The computing system of claim 5, wherein obtaining the local tuning data for the demographic stratification comprises:

obtaining first local tuning data for the sub-region;

adding demographic information to first local tuning data; and obtaining, as the local tuning data for the demographic stratification, a subset of the first local tuning data associated with the demographic stratification.

7. A method comprising:

obtaining, by a computing system, national audience measurement data indicative of exposure to an item of media content for respective households in a geographic region, wherein the national audience measurement data comprises respective demographic data for the respective households, and wherein the national audience measurement data characterizes person-level exposure to the item of the media content;

obtaining, by the computing system, local population data for a sub-region of the geographic region, wherein the local population data comprises demographic data for the sub-region;

weighting, by the computing system, samples of the national audience measurement data based on the local population data for the sub-region to provide weighted samples of the national audience measurement data;

obtaining, by the computing system using the weighted samples of the national audience measurement data, an initial audience measurement metric for the sub-region for the item of media content;

obtaining, by the computing system, local tuning data indicative of an estimated audience in the sub-region for the item of media content, wherein the local tuning data does not include demographic information and characterizes device-level exposure to the item of media content; and scaling, by the computing system, the initial audience measurement metric using the local tuning data so as to determine a local audience measurement metric for the sub-region for the item of media content.

8. The method of claim 7, wherein the method further comprises sampling the national audience measurement data so as to obtain the samples of the national audience measurement data associated with a subset of the respective households; and weighting the samples of the national audience measurement data comprises weighting the samples of the national audience measurement data using the demographic data for the sub-region to account for a difference between a demographic makeup of the subset of the respective households and a demographic makeup of the.

9. The method of claim 7, wherein:

the local tuning data is obtained from a given type of media device that is located in respective households of the sub-region and reports media content measurement data;

the national audience measurement data comprises device data identifying individual households of the respective households having the given type of media device;

the method further comprises determining a factor based on an amount of households represented within the weighted samples of the national audience measurement data having the given type of media device; and scaling the initial audience measurement metric using the local tuning data comprises scaling the initial audience measurement metric using the factor.

10. The method of claim 9, wherein the given type of media device is a given type of set-top box.

11. The method of claim 7, wherein:

obtaining the initial audience measurement metric for the sub-region for the item of media content comprises obtaining an initial audience measurement metric for a demographic stratification for the sub-region for the item of media content;

obtaining the local tuning data indicative comprises obtaining local tuning data for the demographic stratification for the sub-region for the item of media content; and the local audience measurement metric for the sub-region for the item of media content is a local audience measurement for the demographic stratification or the sub-region for the item of media content.

12. The method of claim 11, wherein obtaining the local tuning data for the demographic stratification comprises:

obtaining first local tuning data for the sub-region;

adding demographic information to first local tuning data; and obtaining, as the local tuning data for the demographic stratification, a subset of the first local tuning data associated with the demographic stratification.

13. A non-transitory computer-readable medium having stored therein instructions that when executed by a computing system, cause the computing system to perform a set of operations comprising:

obtaining national audience measurement data indicative of exposure to an item of media content for respective households in a geographic region, wherein the national audience measurement data comprises respective demographic data for the respective households, and wherein the national audience measurement data characterizes person-level exposure to the item of media content;

obtaining local population data for a sub-region of the geographic region, wherein the local population data comprises demographic data for the sub-region;

weighting samples of the national audience measurement data based on the local population data for the sub-region to provide weighted samples of the national audience measurement data;

obtaining, using the weighted samples of the national audience measurement data, an initial audience measurement metric for the sub-region for the item of media content;

obtaining local tuning data indicative of an estimated audience in the sub-region for the item of media content, wherein the local tuning data does not include demographic information and characterizes device-level exposure to the item of the media content; and scaling the initial audience measurement metric using the local tuning data so as to determine a local audience measurement metric for the sub-region for the item of media content.

14. The non-transitory computer-readable medium of claim 13, wherein:

the set of operations further comprises sampling the national audience measurement data so as to obtain the samples of the national audience measurement data associated with a subset of the respective households; and weighting the samples of the national audience measurement data comprises weighting the samples of the national audience measurement data using the demographic data for the sub-region to account for a difference between a demographic makeup of the subset of the respective households and a demographic makeup of the sub-region.

15. The non-transitory computer-readable medium of claim 13, wherein:

the local tuning data is obtained from a given type of media device that is located in respective households of the sub-region and reports media content measurement data;

the national audience measurement data comprises device data identifying individual households of the respective households having the given type of media device;

the set of operations further comprises determining a factor based on an amount of households represented within the weighted samples of the national audience measurement data having the given type of media device; and scaling the initial audience measurement metric using the local tuning data comprises scaling the initial audience measurement metric using the factor.

16. The non-transitory computer-readable medium of claim 15, wherein the given type of media device is a given type of set-top box.

17. The non-transitory computer-readable medium of claim 13, wherein:

obtaining the initial audience measurement metric for the sub-region for the item of media content comprises obtaining an initial audience measurement metric for a demographic stratification for the sub-region for the item of media content;

obtaining the local tuning data indicative comprises obtaining local tuning data for the demographic stratification for the sub-region for the item of media content; and the local audience measurement metric for the sub-region for the item of media content is a local audience measurement for the demographic stratification or the sub-region for the item of media content.

* * * * *